United States Patent
Rodney (10) Patent No.: US 9,581,718 B2
(45) Date of Patent: Feb. 28, 2017

(54) SYSTEMS AND METHODS FOR RANGING WHILE DRILLING

(75) Inventor: Paul F. Rodney, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 164 days.

(21) Appl. No.: 13/577,329

(22) PCT Filed: Mar. 31, 2011

(86) PCT No.: PCT/US2011/030639
§ 371 (c)(1),
(2), (4) Date: Aug. 6, 2012

(87) PCT Pub. No.: WO2012/134468
PCT Pub. Date: Oct. 4, 2012

(65) Prior Publication Data
US 2014/0035586 A1    Feb. 6, 2014

Related U.S. Application Data (60) Provisional application No. 61/319,546, filed on Mar. 31, 2010.

(51) Int. Cl.
*G01V 3/08* (2006.01)
*G01V 3/15* (2006.01)
(Continued)

(52) U.S. Cl.
CPC ......... *G01V 3/081* (2013.01); *E21B 47/02216* (2013.01); *G01V 3/15* (2013.01); *G01V 3/26* (2013.01)

(58) Field of Classification Search
CPC ...... G01V 3/081; G01V 3/15; E21B 47/02216
(Continued)

(56) References Cited

U.S. PATENT DOCUMENTS

| 407,220 A | 7/1889 | King |
|---|---|---|
| 2,183,565 A | 12/1939 | Hawley |

(Continued)

FOREIGN PATENT DOCUMENTS

| WO | WO03/040762 | * 5/2003 |
|---|---|---|
| WO | WO-2009151867 | 12/2009 |

(Continued)

OTHER PUBLICATIONS

Gardner, Wallace R., et al., "Downhole Telemetry System Using Discrete Multi-Tone Modulation in a Wareless Communication Medium", U.S. Appl. No. 10/364,169, filed Feb. 10, 2003, 25.

(Continued)

*Primary Examiner* — Reena Aurora
(74) *Attorney, Agent, or Firm* — Iselin Law PLLC; Benjamin Fite (57) ABSTRACT

An improved system and method for ranging while drilling, in effect, induces a dynamic hot spot on the casing of a nearby well. The induced hot spot acts as a magnetic source that can be reliably detected from within the drillstring and in such a manner as to infer the relative position and orientation of the casing to the drillstring. At least some disclosed method embodiments employ one or more rotating magnets in the drillstring, an array of at least two magnetometers in the drillstring and one or more phase-locked loops that are used to enhance the signal to noise ratio of the magnetic signal scattered off of the casing from the rotating magnetic field. The rotating magnet or magnets may be magnetic dipoles or magnetic multipoles, and may be modulated to enable the use of multiple magnetic field sources.

22 Claims, 6 Drawing Sheets

(51) Int. Cl.
 *G01V 3/26* (2006.01)
 *E21B 47/022* (2012.01)
(58) Field of Classification Search
 USPC ................................... 324/323–377, 207.25
 See application file for complete search history.

(56) References Cited

U.S. PATENT DOCUMENTS

| | | | |
|---|---|---|---|
| 3,350,634 A | 10/1967 | Hoehn, Jr. | |
| 3,406,766 A | 10/1968 | Henderson | |
| 3,731,752 A | 5/1973 | Schad | |
| 3,745,446 A | 7/1973 | Norris | |
| 3,967,201 A | 6/1976 | Rorden | |
| 4,323,848 A | 4/1982 | Kuckes | |
| 4,458,767 A | 7/1984 | Hoehn, Jr. | |
| 4,529,939 A | 7/1985 | Kuckes | |
| 4,590,593 A | 5/1986 | Rodney | |
| 4,593,770 A | 6/1986 | Hoehn, Jr. | |
| 4,675,488 A | 6/1987 | Mucha et al. | |
| 4,700,142 A | 10/1987 | Kuckes | |
| 4,791,373 A | 12/1988 | Kuckes | |
| 4,933,640 A | 6/1990 | Kuckes | |
| 4,980,642 A | 12/1990 | Rodney | |
| 5,074,365 A | 12/1991 | Kuckes | |
| 5,103,177 A * | 4/1992 | Russell et al. | 324/346 |
| 5,138,313 A | 8/1992 | Barrington | |
| 5,218,301 A | 6/1993 | Kuckes | |
| 5,305,212 A | 4/1994 | Kuckes | |
| 5,485,089 A | 1/1996 | Kuckes | |
| 5,515,931 A | 5/1996 | Kuckes | |
| 5,541,517 A | 7/1996 | Hartmann et al. | |
| 5,589,775 A | 12/1996 | Kuckes | |
| 5,657,826 A | 8/1997 | Kuckes | |
| 5,675,488 A | 10/1997 | McElhinney | |
| 5,725,059 A | 3/1998 | Kuckes et al. | |
| 5,886,303 A | 3/1999 | Rodney | |
| 5,923,170 A * | 7/1999 | Kuckes | 324/326 |
| RE36,569 E | 2/2000 | Kuckes | |
| 6,075,462 A | 6/2000 | Smith | |
| 6,098,727 A | 8/2000 | Ringgenberg et al. | |
| 6,160,492 A | 12/2000 | Herman | |
| 6,257,334 B1 | 7/2001 | Cyr | |
| 6,439,324 B1 | 8/2002 | Ringgenberg et al. | |
| 6,453,239 B1 * | 9/2002 | Shirasaka et al. | 701/508 |
| 6,466,020 B2 | 10/2002 | Kuckes et al. | |
| 6,630,890 B1 | 10/2003 | Endo et al. | |
| 6,657,597 B2 | 12/2003 | Rodney et al. | |
| 6,736,222 B2 | 5/2004 | Kuckes et al. | |
| 6,750,783 B2 | 6/2004 | Rodney | |
| 6,791,469 B1 | 9/2004 | Rao et al. | |
| 6,827,158 B1 | 12/2004 | Dimitroff et al. | |
| 7,017,662 B2 | 3/2006 | Schultz et al. | |
| 7,030,617 B2 | 4/2006 | Conti | |
| 7,084,782 B2 | 8/2006 | Davies et al. | |
| 7,188,689 B2 | 3/2007 | Maxwell et al. | |
| 7,212,132 B2 | 5/2007 | Gao et al. | |
| 7,219,747 B2 | 5/2007 | Gleitman et al. | |
| 7,219,748 B2 | 5/2007 | Gao et al. | |
| 7,287,603 B2 | 10/2007 | Hay et al. | |
| 7,301,223 B2 | 11/2007 | Rodney et al. | |
| 7,336,199 B2 | 2/2008 | Lasater et al. | |
| 7,407,020 B2 | 8/2008 | Gleitman et al. | |
| 7,413,034 B2 | 8/2008 | Kirkhope et al. | |
| 7,505,242 B2 * | 3/2009 | Gullich | 361/143 |
| 7,650,269 B2 | 1/2010 | Rodney | |
| 7,668,583 B2 | 2/2010 | Fegert et al. | |
| 7,686,099 B2 | 3/2010 | Rodney | |
| 7,743,654 B2 | 6/2010 | Spross et al. | |
| 7,757,781 B2 | 7/2010 | Hay et al. | |
| 7,812,610 B2 | 10/2010 | Clark et al. | |
| 8,170,851 B2 | 5/2012 | Rodney | |
| 9,010,461 B2 | 4/2015 | Hay | |
| 2002/0105332 A1 * | 8/2002 | Rosthal et al. | 324/338 |
| 2002/0113592 A1 * | 8/2002 | Omeragic | 324/339 |
| 2003/0085059 A1 * | 5/2003 | Kuckes et al. | 175/45 |
| 2003/0117134 A1 | 6/2003 | Almaguer | |
| 2003/0184303 A1 * | 10/2003 | Homan et al. | 324/339 |
| 2004/0004553 A1 | 1/2004 | Rodney | |
| 2004/0119476 A1 * | 6/2004 | Homan et al. | 324/342 |
| 2004/0156264 A1 | 8/2004 | Gardner et al. | |
| 2004/0249573 A1 | 12/2004 | Mc Elhinney | |
| 2005/0154532 A1 * | 7/2005 | Close et al. | 702/6 |
| 2005/0156602 A1 | 7/2005 | Conti | |
| 2005/0168225 A1 | 8/2005 | Haber et al. | |
| 2005/0173119 A1 | 8/2005 | Hay et al. | |
| 2005/0288576 A1 * | 12/2005 | Fegert et al. | 600/425 |
| 2006/0036376 A1 * | 2/2006 | Gudmundsson et al. | 702/38 |
| 2006/0254820 A1 | 11/2006 | Cole et al. | |
| 2007/0126426 A1 | 6/2007 | Clark et al. | |
| 2007/0278008 A1 | 12/2007 | Kuckes et al. | |
| 2008/0018334 A1 | 1/2008 | Reiderman | |
| 2008/0041626 A1 | 2/2008 | Clark | |
| 2008/0316048 A1 | 12/2008 | Abdallah | |
| 2009/0030615 A1 * | 1/2009 | Clark | 702/7 |
| 2009/0164127 A1 * | 6/2009 | Clark | 702/7 |
| 2010/0108383 A1 | 5/2010 | Hay et al. | |
| 2010/0219646 A1 | 9/2010 | Hay et al. | |
| 2010/0305864 A1 | 12/2010 | Gies | |
| 2011/0153217 A1 | 6/2011 | Rodney | |
| 2011/0175899 A1 | 7/2011 | Bittar et al. | |
| 2012/0126993 A1 | 5/2012 | Samson et al. | |
| 2012/0158305 A1 | 6/2012 | Rodney et al. | |
| 2012/0162631 A1 * | 6/2012 | Hutchin | 356/4.07 |
| 2015/0002306 A1 | 1/2015 | Hay et al. | |
| 2015/0119687 A1 * | 4/2015 | Hornsteiner | 600/409 |

FOREIGN PATENT DOCUMENTS

| | | |
|---|---|---|
| WO | WO-2010/141004 | 12/2010 |
| WO | 2011/002461 | 1/2011 |
| WO | WO-2011019340 | 2/2011 |

OTHER PUBLICATIONS

GE Energy, "Magrange III—Your Shortcut to Blowout Well Control", GE Energy—Oil & Gas Solutions, gepower.com/oilexploration, Twinburg, OH, (Oct. 2004), 4 pgs.

Gladiator Technologies, "New Low Noise Verion of G507 MEMS Gyro", http://www.gladiatortechnologies.com/NEWS/pressRoom_New . . . , G50Z "LN Series" (Low Noise) Enables Demanding Stabilization Applications a Low Cost, Light Weight and VSG Compatible Alternative,(Sep. 21, 2009), 1 pg.

Halliburton Energy Services, Inc, "Sperry Drilling Services Active Magnetic Ranging System", www@halliburton.com, H05637, (Jun. 2008), 2 pgs.

Hay, Richard T., "Borehole Array for Ranging and Crosswell Telemetry", filed Jul. 2, 2009, Application No. PCT/US09/49470, 16 pgs.

International Search Report and Written Opinion, dated Sep. 9, 2009, Appl No. PCT/US09/49470, "Borehole Array for Ranging and Crosswell Telemetry", filed Jul. 2, 2009.

PCT International Preliminary Report on Patentability, dated Jan. 12, 2012, Appl No. PCT/US09/49470, "Borehole Array for Ranging and Crosswell Telemetry", filed Jul. 2, 2009, 7 pgs.

PCT International Preliminary Report on Patentability, dated Dec. 15, 2011, Appl No. PCT/US2009/045773, "Guide Wire for Ranging and Sub-Surface Broadcast Telemetry", filed Jun. 1, 2009. 7 pgs.

PCT Internat'l Search Report and Written Opinion, dated Jul. 20, 2009, Appl No. PCT/US2009/045773, "Guide Wire for Ranging and Sub-Surface Broadcast Telemetry", filed Jun. 1, 2009. 7 pgs.

Rodney, Paul F., et al., "Systems and Methods for Displaying Logging Data", U.S. Appl. No. 12/295,158, filed Sep. 29, 2008, 16 pgs.

US Application, dated Mar. 31, 2011, U.S. Appl. No. 13/577,329, "Systems and Methods for Ranging While Drilling", filed Mar. 31, 2011, 18 pgs.

US Provisional Application, dated Mar. 31, 2010, U.S. Appl. No. 61/319,546, "Passive Ranging-While Drilling", filed Mar. 31, 2010, 19 pgs.

(56) References Cited

OTHER PUBLICATIONS

Wikipedia, "Lock-in amplifier", Wikipedia, http://en.wikipedia.org/wiki/Lock-in_amplifier, (Mar. 25, 2011), 6 pgs.
Williamson, Hugh S., "Accuracy Prediction for Directional MWD", SPE 56702, presented at the 1999 SPE Annual Technical Conference and Exhibition held in Houston, TX Oct. 3-6, 1999., 16 pgs.
US Non-Final Office Action, dated Jul. 18, 2013, U.S. Appl. No. 13/055,852, "Guide Wire for Ranging and Subsurface Broadcast Telemetry", filed Jun. 1, 2009, 10 pgs.
PCT International Preliminary Report on Patentability, dated Oct. 10, 2013, Appl. No. PCT/US2011/030639, "Systems and Methods for Ranging While Drilling", filed May 31, 2011, 7 pgs.
US Final Office Action, dated Jan. 23, 2014, U.S. Appl. No. 13/055,852, "Guide Wire for ranging and subsurface broadcast telemetry," filed Jan. 25, 2011, 10 pgs.
US Non-Final Office Action, dated Jun. 13, 2014, U.S. Appl. No. 13/055,852, "Guide Wire for ranging and subsurface broadcast telemetry," filed Jan. 25, 2011, 10 pgs.
US Non-Final Office Action, dated Feb. 11, 2015, U.S. Appl. No. 14/488,170, "Borehole Array for Ranging and Crosswell Telemetry", filed Sep. 16, 2014, 13 pgs.
"EP Extended Search Report", dated Oct. 8, 2015 "Systems and Methods for Ranging While Drilling" Appln. No. 11859018.1, filed Mar. 31, 2011, 6 pgs.
"US Final Office Action", dated Jul. 21, 2015, U.S. Appl. No. 14/488,170, "Borehole Array for Ranging and Crosswell Telemetry", filed Sep. 16, 2014, 20 pgs.
"US Non-Final Office Action", dated Mar. 24, 2016, U.S. Appl. No. 14/488,170, "Borehole Array for Ranging and Crosswell Telemetry", filed Jul. 2, 2009, 20 pgs.

\* cited by examiner

SYSTEMS AND METHODS FOR RANGING WHILE DRILLING

CROSS-REFERENCE TO RELATED APPLICATIONS

This application claims priority to Provisional U.S. Application 61/319,546, "Passive Ranging While Drilling" and filed Mar. 31, 2010 by Paul F. Rodney, which is hereby incorporated herein by reference.

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. These techniques often involve drilling a borehole in close proximity to one or more existing wells. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than 10 meters apart, and careful control of the spacing is important to the technique's effectiveness. Other examples of directed drilling near an existing well include intersection for blowout control, multiple wells drilled from an offshore platform, and closely spaced wells for geothermal energy recovery.

One way to direct a borehole in close proximity to an existing well is "active ranging" in which an electromagnetic source is located in the existing well and monitored via sensors on the drillstring. By contrast systems that locate both the source and the sensors on the drillstring are often termed "passive ranging". Passive ranging may be preferred to active ranging because it does not require that operations on the existing well be interrupted. Existing passive ranging techniques rely on magnetic "hot spots" in the casing of the existing well, which limits the use of these techniques to identify areas where there is a significant and abrupt change in the diameter of casing or where the casing has taken on an anomalous magnetic moment, either by pre-polarization of the casing before it is inserted into the wellbore, or as a random event. See, e.g., U.S. Pat. No. 5,541,517 "A Method for drilling a borehole from one cased borehole to another cased borehole." In order to carry out such a polarization without interrupting production, it has been regarded as necessary to polarize the casing at some point in the construction of the well. This approach cannot be applied to wells that are already in commercial service without interrupting that service.

BRIEF DESCRIPTION OF THE DRAWINGS

A better understanding of the various disclosed embodiments can be obtained when the following detailed description is considered in conjunction with the accompanying drawings, in which:

FIG. 3 shows a signal processing circuit incorporating a phase-locked loop;

While the invention is susceptible to various modifications and alternative forms, specific embodiments thereof are shown by way of example in the drawings and will herein be described in detail. It should be understood, however, that the drawings and detailed description are not intended to limit the disclosure to these particular embodiments, but on the contrary, the intention is to cover all modifications, equivalents and alternatives falling within the scope of the appended claims.

DETAILED DESCRIPTION

The issues identified in the background are at least partly addressed by an improved system and method for ranging while drilling. The approach described here, in effect, induces a dynamic hot spot on the casing that acts as a magnetic source that can be reliably detected from within the drillstring and which can be detected in such a manner as to infer the relative position and orientation of the casing to the drillstring. At least some disclosed method embodiments employ one or more rotating magnets in the drillstring, an array of at least two magnetometers in the drillstring and one or more phase-locked loops that are used to enhance the signal to noise ratio of the magnetic signal scattered off of the casing from the rotating magnetic field. The rotating magnet or magnets may be magnetic dipoles or magnetic multipoles. Preferably (although not necessarily), at least one of the rotating magnets has a magnetic moment that is at an angle to the borehole axis, the angle being neither parallel nor perpendicular to the borehole axis.

At least some disclosed system embodiments include a drillstring and a processor. The drillstring includes a magnetic source, at least one magnetometer, and a rotation sensor. The magnetic source induces a magnetic moment in a nearby casing string, which in turn puts off a magnetic field that can be detected by the magnetometer. The processor combines the rotation sensor measurements with the magnetometer measurements to estimate a relative distance and direction to the casing string. The rotation sensor can be a magnetometer spaced further away from the magnetic source, or it can be a gyroscope, accelerometer, borehole wall sensor, or other form of rotation sensing device. The rotation information enables the filtering out of the earth's magnetic field and other static field components thereby enabling detection of the casing string at an estimated range of at least 10 meters.

Figure 1:
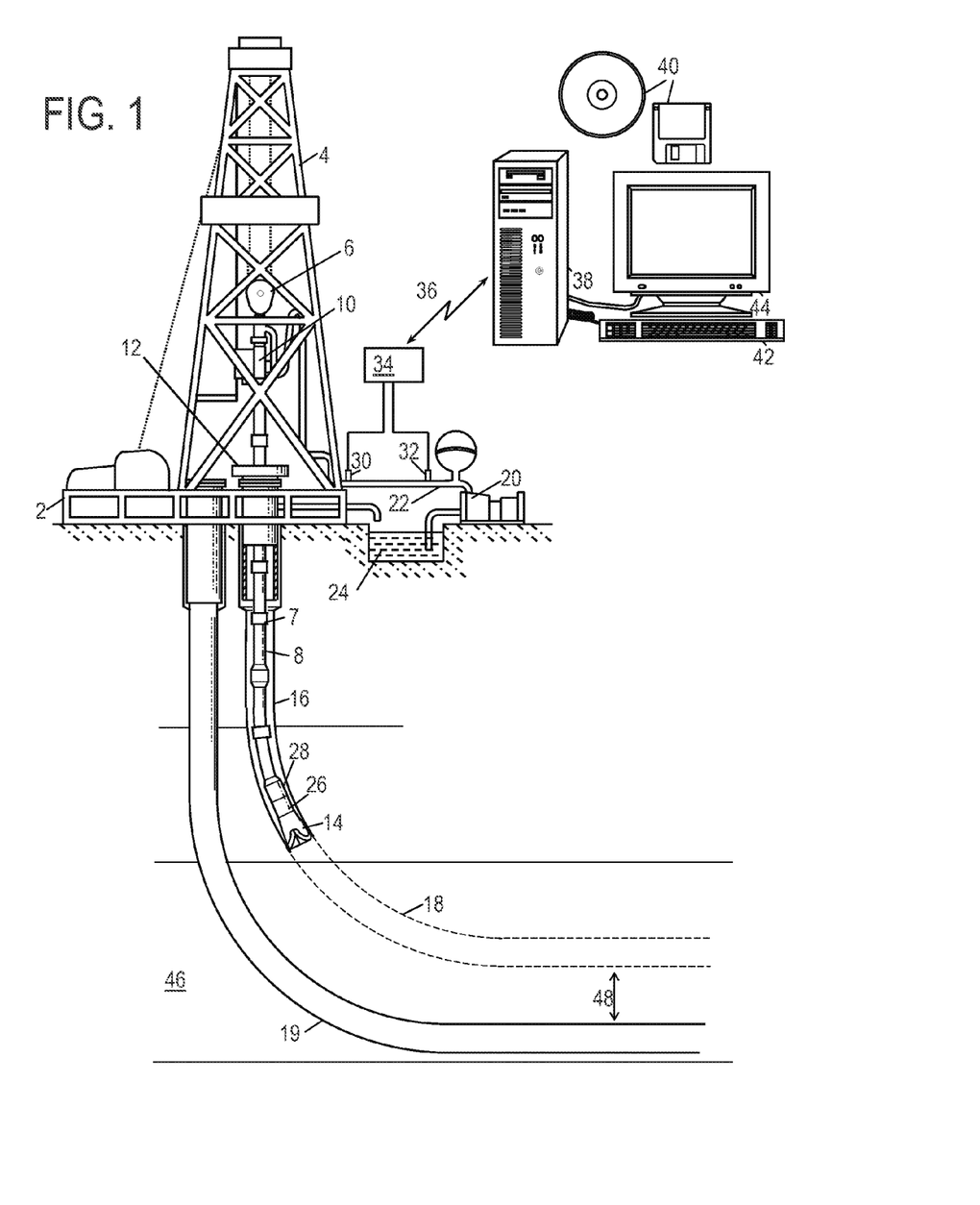
FIG. 1 shows an illustrative drilling environment in which electromagnetically-guided drilling may be employed.

The disclosed systems and methods are best understood in the context of the larger systems in which they operate. Accordingly, FIG. 1 shows an illustrative geosteering environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations.

The drill bit 14 is just one piece of a bottom-hole assembly that includes one or more drill collars (thickwalled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 26 to induce a magnetic moment in nearby casing strings and to collect measurements of the resulting field to determine distance and direction. Using these measurements in combination with the tool orientation measurements, the driller can steer the drill bit 14 along a desired path 18 relative to the existing well 19 in formation 46 using any one of various suitable directional drilling systems, including steering vanes, a "bent sub", and a rotary steerable system to steer the drill bit along a desired path 18 parallel to an existing borehole. For precision steering, the steering vanes may be the most desirable steering mechanism. The steering mechanism can be alternatively controlled downhole, with a downhole controller programmed to follow the existing borehole 19 at a predetermined distance 48 and position (e.g., directly above or below the existing borehole).

A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity. Moreover, a telemetry sub 28 coupled to the downhole tools 26 can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that other forms of telemetry exist and may be used to communicate signals from downhole to the digitizer. Such telemetry may employ acoustic telemetry, electromagnetic telemetry, or telemetry via wired drillpipe.

The digitizer 34 supplies a digital form of the telemetry signals via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. For example, a driller could employ this system to obtain and monitor drilling parameters, formation properties, and the path of the borehole relative to the existing borehole 19 and any detected formation boundaries. A downlink channel can then be used to transmit steering commands from the surface to the bottom-hole assembly.

Figure 2:
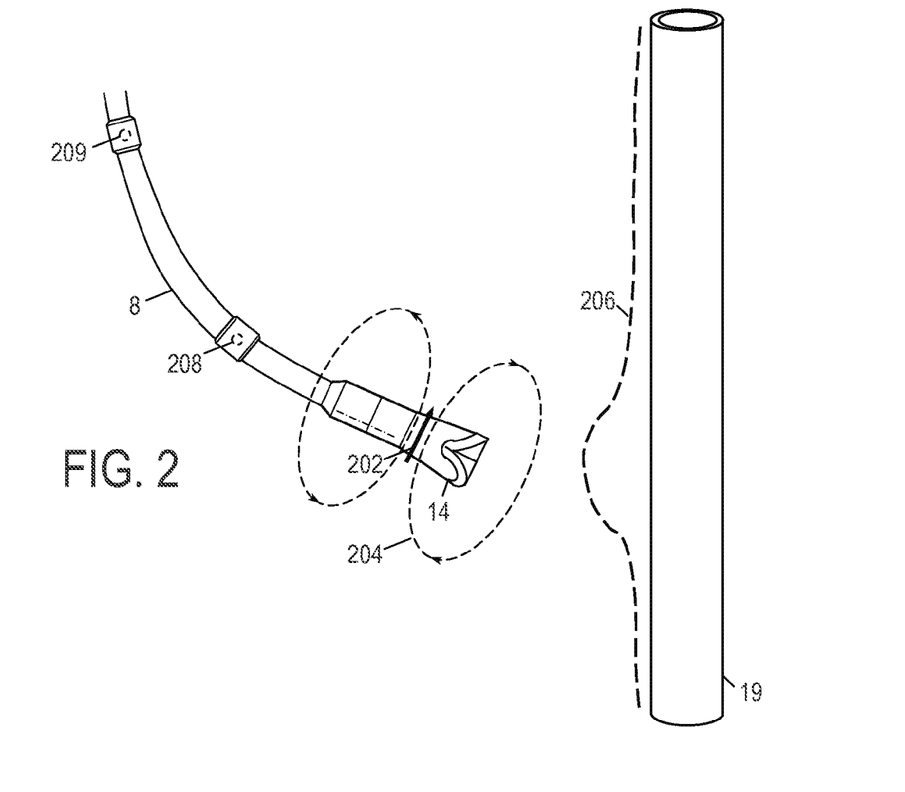
FIG. 2 shows an illustrative arrangement for passive ranging.

The principle of operation will now be briefly described. Consider for simplicity a magnetic dipole 202 (e.g., a permanent magnet or other mechanism for creating a strong magnetic field) incorporated into a drill bit 14 with its moment orthogonal to the symmetry axis of the drill bit, as shown in FIG. 2. (It turns out that this may not be the best configuration for the magnet, but considerable insight can be gained by considering it before moving on to a discussion of other configurations.) Assuming that the casing 19 is made out of magnetically permeable material (which is usually the case), the field 204 from magnet 202 induces a distribution 206 of magnetic moment along the casing. Most of the moment is induced along the axis of the casing, although some component is induced orthogonal to the axis. Since the contribution from the induced moment orthogonal to the axis of the casing is small, it will be neglected in this discussion, i.e., it will be assumed that the induced moment lies along the axis of the casing.

For the illustrated geometry, the direction of the casing's induced moment is the same along the length of the casing, while the magnitude varies in accordance with a distribution similar to that sketched in FIG. 2. As the drill bit 14 rotates, the distribution of magnetic moment induced along the casing changes. In some configurations, the moment changes direction along the casing (either parallel to the axis of the casing or anti-parallel to the axis of the casing).

The time varying magnetic field induced along the casing sets up a magnetic field that is observable at one or more observation points on the drillstring 8, preferably with a three-axis magnetometer 208, and more preferably with a plurality of three-axis magnetometers 208, 209 constituting a differential magnetometer. The magnitude of the received signal is a strong function of the distance of the observation point or points from the casing, while the phase of the signal and the distribution in time of the signal are functions of the orientation of the rotating magnetic source relative to the casing and of the spatial distribution of the casing.

The magnetic field at the observation point(s) is composed of four terms: (1) the earth's magnetic field; (2) the magnetic field from the drillstring's magnetic field source; (3) magnetic fields from currents in the drillstring; and (4) the magnetic field from the induced casing moment. To the extent that the earth's magnetic field is parallel to the drillstring axis, it creates a static field that can be readily measured and canceled. To the extent that it is orthogonal to the drillstring axis, the earth's magnetic field appears as a sinusoidal oscillation having the same frequency as the rotation of the drillstring. Both the static and oscillatory components can be readily measured and canceled. In at least some system embodiments, a remote observation point (e.g., magnetometers 209) are used to determine the earth's magnetic field strength and orientation.

The second term is the magnetic field from the source. The source has a fixed magnitude and a relatively fixed orientation and distance from the observation point. Accordingly, this term is primarily a static field, although it may acquire a dynamic element to the extent that there is torsion or bending of the drillstring between the point of observation and the source location. This term can be eliminated by placing the magnetic field sensor(s) sufficiently far from the magnetic source that they do not saturate and AC coupling the output of the magnetometers to the signal processing circuitry. Some embodiments may employ torque and strain sensors to detect motion of the source relative to the observation point(s) and compensate accordingly. Alternatively, additional observation points can be used to measure the separate contributions of the source and the earth's magnetic field. (The relatively fixed field from the earth and the faster-decaying field from the source enable the different observation points to distinguish these contributions from each other and from the induced magnetic moment in the casing.)

The third term is attributable to electrical currents in the drillstring. Such currents are described, for example, in U.S. Pat. No. 7,650,292 "Method and apparatus for surveying a borehole with a rotating sensor package", along with techniques for combating such currents. In at least some embodiments, such currents are prevented by creating an insulating gap along the drillstring axis near the observation point. Suitable gap constructions are described in, e.g., U.S. Pat. Nos. 5,138,313 ("Electrically insulative gap sub assembly for tubular goods"); 6,098,727 ("Electrically insulating gap subassembly for downhole electromagnetic transmission"); and 6,439,324 ("Electrically insulating gap subassembly for downhole electromagnetic transmission").

The fourth term is the magnetic field from the casing, which consists of two parts: a static contribution and a dynamic contribution. The static contribution is normally not measurable at a range considered safe for collision avoidance unless there are magnetic hot spots along the casing, as described earlier. The dynamic contribution comes from the time varying distribution of induced magnetic moment along the casing. At least some system embodiments focus on detecting this dynamic contribution and using that to estimate distance and direction to the casing.

Static field contributions (e.g., the earth's magnetic field and the static contribution from the casing) can be used to provide a reference signal for a phase lock loop or another similar noise filter which can be applied to the observed field so as to single out only the components that are synchronized with rotation. It is anticipated that somewhere between 60 and 90 dB of noise attenuation can be obtained with such a technique given the typical performance of phase-locked loops. From a signal processing standpoint, the simplest way of obtaining such a reference signal is to place a magnetometer far enough from the source 202 that it will not measure an appreciable component of the signal arriving from the casing 19. This magnetometer signal provides both a frequency reference and a copy of the uncorrupted earth's magnetic field that can be subtracted from the magnetic field measured closer to the source at a point where the signal arriving from the casing has a measurable value, thus greatly boosting the signal to noise ratio. In addition, this signal provides a frequency reference for a phase-locked loop.

Figure 3:
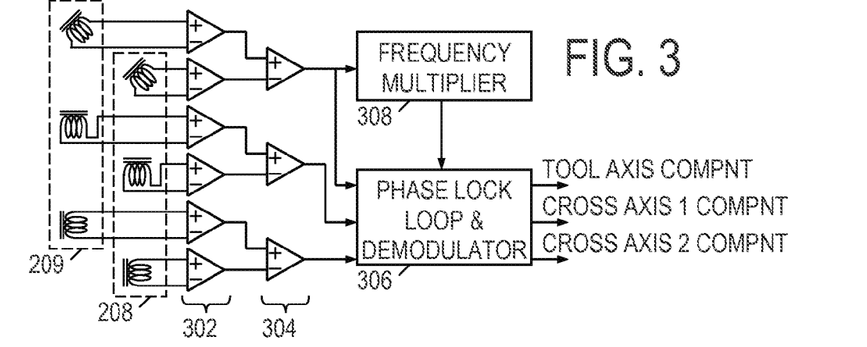
FIG. 3 shows an illustrative circuit for measuring induced field components.

FIG. 3 shows an illustrative circuit for such signal processing. A set of operational amplifiers 302 amplifies the voltage from each of the axial and cross-axial magnetometers at observation points 208, 209. A second set of differential amplifiers 304 determines a difference between the respective axial measurements at observation points 208, 209, and the respective cross-axial measurements. The differential measurements are filtered and demodulated by a phase lock loop 306 to produce three orthogonal component measurements of the observed magnetic field. An optional frequency multiplier 308 may operate on one of the differential cross-axial measurement signals to provide the reference clock for the phase lock loop. Note that when multipole sources are used, a harmonic (the order of which depends on the number of poles) of the rotation speed must be used to phase-lock with the signal (Note, as used here, multipole refers to any configuration with more than 2 poles, whether it be a multi-dipole field or a true multipole field in the mathematical sense). The second harmonic can be generated by squaring the signal and high-pass filtering it. Higher harmonics can be generated in a similar manner. The phase-locked loop is preferably a digital phase-locked loop (DPLL). Many types of DPLLs are well known in the industry. In practice, the fundamental frequency and several of the harmonics may be processed by repeating the circuit shown in FIG. 3.

The circuit in FIG. 3 presumes that the two observation points 208, 209 are related in a fairly rigid sense. Where it is desired to allow for bending and twisting of the drillstring, a microprocessor or other programmable circuit can be used to perform adaptive tracking of the geometrical relationship between the two observation points and to compensate accordingly when deriving differential signals.

It may prove impractical to use a remote magnetometer 209 in some embodiments. In this case, the earth's magnetic field component can be estimated from the three-axis magnetometer outputs of the magnetometer intended to sense the casing signal (magnetometer 208) since the total field should be constant and the total cross-axial field should vary very slowly as drilling progresses. This, however, will involve more signal processing and may not be as effective as the differential magnetometer approach of FIG. 3. The reference signal for the phase lock loop can be obtained with an accelerometer, inclinometer, gyroscope, or other rotation sensing mechanism. MEMS (microelectromechanical systems) gyros are available with a drift rate of $0.005°/s$ square_root(Hz). One such sensor is the G50Z Gyro by Gladiator Technologies, Inc. To obtain a reasonable response with this gyro, it would be desirable to open the frequency up to about 100 Hz and measure the signal for about 10 seconds. During this period, the gyro will have drifted an average of $0.5°$ in its measurements, which will somewhat impair the performance of the phase locked loop. The rotation frequency information obtained using the gyro can be combined with the orientation of the gyro relative to the magnetometer axes and information about the tool orientation and magnetic field of the earth to provide estimates of the earth-field component in the signal received at the magnetometers used to sense the signal from the casing. The survey measurements would be made at a point in the drillstring where the source does not interfere with the survey tool.

Once the casing component of the magnetic signal has been obtained, it can be interpreted in terms of the applicable physics. This will now be described briefly. Details of how the calculation is carried out are given in the appendix. Though the derivation in the appendix is not perfectly general, it is nevertheless illustrative of an approach that will yield estimated distance and direction from the sensor measurements. In the appendix, a solution is made for the magnetic field measured at a point in a vertical borehole with a dipole source having a dipole moment orthogonal to the borehole. The casing is assumed to fall on a linear trajectory. Furthermore, only the field component along the axis of the casing is considered in the analysis since the cross-axial dimensions of the casing are small compared to the axial dimensions and the perturbation to the field from a complete solution would be small in all cases where collision between the well bore being drilled and the casing was unavoidable without cessation of drilling. The technique described in the appendix is perfectly general in that it is a straightforward, albeit tedious task to incorporate a dipole of arbitrary orientation with respect to the drillstring axis. Similarly, the analysis is amenable to casings with nonlinear profiles in space in that the analysis is reduced to a one-dimensional integral along the axis of the casing. The analysis can be generalized to boreholes and casings of arbitrary shape and orientation, with arbitrary source configuration. For multipole fields, the analysis can be extended as a superposition of dipole fields, though some multipole configurations may require an explicity multipole analysis.

Before looking at some specific calculations, it may be instructive to qualitatively work through some limiting cases. Consider first the case where the axis of the dipole is orthogonal to the drillstring, and both the drillstring and the casing are vertical. With the dipole moment also orthogonal to the casing, the induced field resembles a one-dimensional monopole on either side of the point of intersection of the axis of the dipole with the casing. This follows from a simple visual inspection of the dipole field. We might expect that in this particular case that the received field at a point along the drillstring axis will have a magnitude that falls off approximately as the inverse fifth power of the distance (since the dipole field decays as an inverse cube and the monopole field decays as an inverse square law). However, to observe such behavior, the observation point must be fairly close to the dipole source, or the contributions from the magnetic moments to the observed signal will come disproportionately from the portion of the collar above the point of intersection of the dipole axis with the casing. Hence, it is more reasonable to expect an inverse sixth power dependence for the observed field amplitude.

Next consider the induced field when the dipole is orthogonal to the plane containing the wellbore being drilled and the casing being monitored. In this case, the field lines are orthogonal to the casing, and there is no net dipole moment along the axis of the casing and hence no signal will be observed.

Figure 4A:
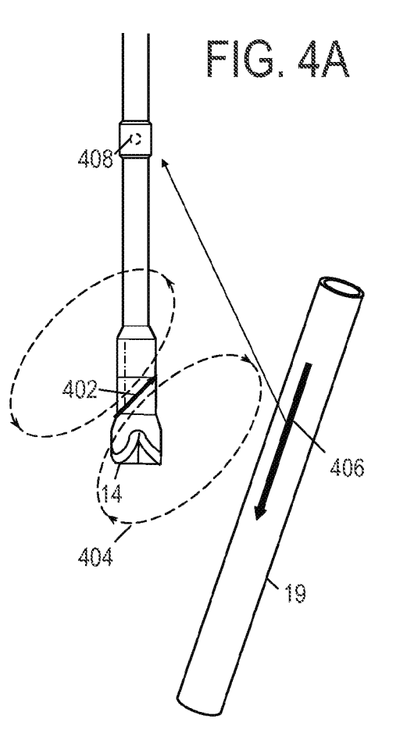
FIGS. 4A-4B illustrate the effect of a tilted magnetic source.
Figure 4B:
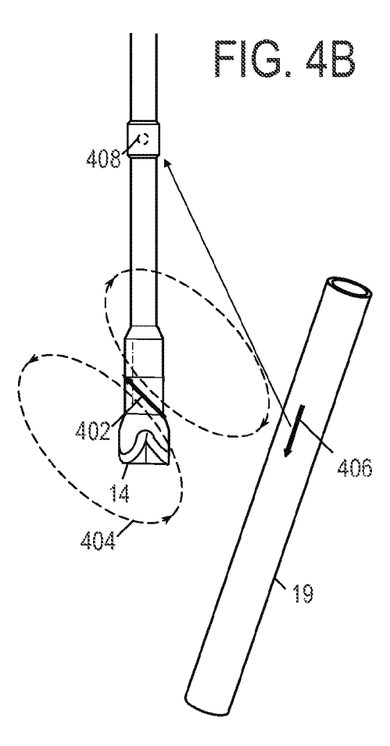

Now consider a third case illustrated in FIGS. 4A-4B where the borehole being drilled is vertical and the casing being monitored is on a linear path in a plane with the path of the wellbore being drilled, but not parallel to that path. Further assume that the moment of the magnetic dipole 402 is not orthogonal to the drillstring axis. In FIG. 4A, the moment of the dipole 402 is in the plane of the wellbore being drilled and the casing being monitored. The projection of the magnetic field lines 404 along the axis of the casing 19, produce a large magnetic moment 406 for observation by magnetometer 408. In FIG. 4B, the drillstring has rotated 180°, producing magnetic field lines 404 that are less uniform along the casing so as to produce a much weaker magnetic moment 406. By inspection it can be determined that the signal received at the observation point will not be symmetrical with the rotation of the drillstring. This would not have been the case if the dipole had been orthogonal to the drillstring axis. Hence, by setting the dipole at an angle that is not orthogonal to the drillstring axis, information has been gained about the orientation of the casing relative to the borehole. The same observation holds even if the casing extends along an arbitrary path non-coplanar with the casing.

It is possible to employ a source having multiple magnets to form a more complex magnetic field. The source may include a magnetic dipole tilted as illustrated in FIGS. 4A-4B and may further include a substantially co-located magnetic dipole that is orthogonal to the drillstring axis (e.g., extending towards the reader out of the plane of FIG. 4A). The field from such a multipole source is the superposition of the fields from the individual dipoles. In this example, each dipole will make a contribution to the observed signal, which, for a constant rotation of the drillstring, will be composed of two sinusoids 90° out of phase with each other. Some alternative embodiments employ multipole sources constructed from dipoles such that (e.g.) all of the north poles face outward from the drillstring and all of the south poles face inward. In this case, the observed frequency would be the number of poles times the rotational frequency.

In what follows, an example is given of the predicted axial and cross-axial field strengths at the observation point as a function of distance of the observation point from the dipole source and of distance between the borehole being drilled and the casing being monitored for the case that the two are parallel, the dipole is orthogonal to the axis of the wellbore being drilled, and the dipole magnetic field at distances large compared to the length of the dipole is given by:

$$B = 10^7/r^3$$

where B is the magnitude of the magnetic field in nanoteslas (nT) and r is the distance from the dipole in meters (m). This is a fairly strong, but achievable field. It is further assumed that the casing has an outer radius of 6.75 inches, an inner radius of 6.125 inches and a relative magnetic permeability of 500. Strictly speaking, magnetic permeability is not a concept that applies to ferrous materials, but it is a reasonable approximation.

Figure 5A:
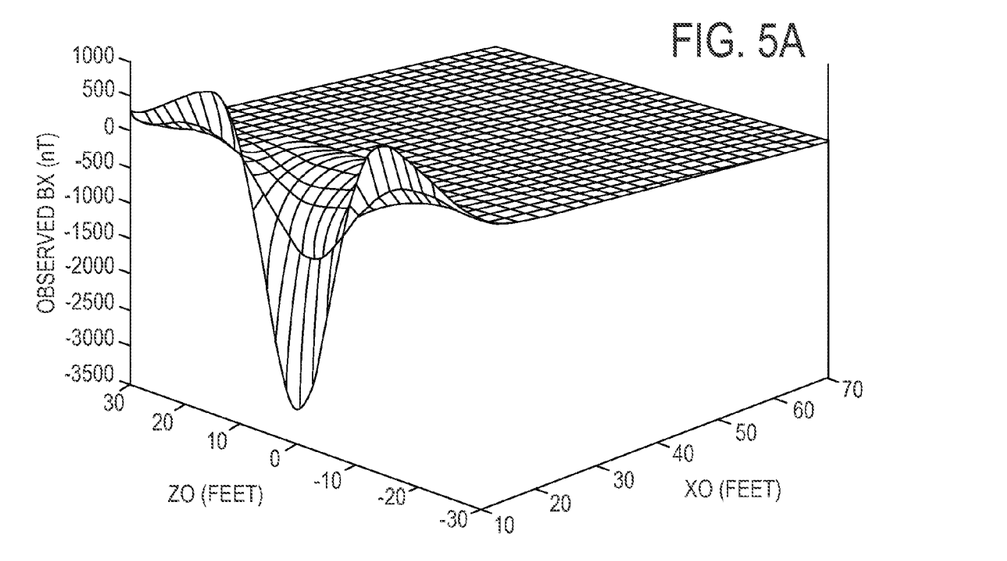
FIGS. 5A-5B show a predicted cross-axial field strength as a function of distance.
Figure 5B:
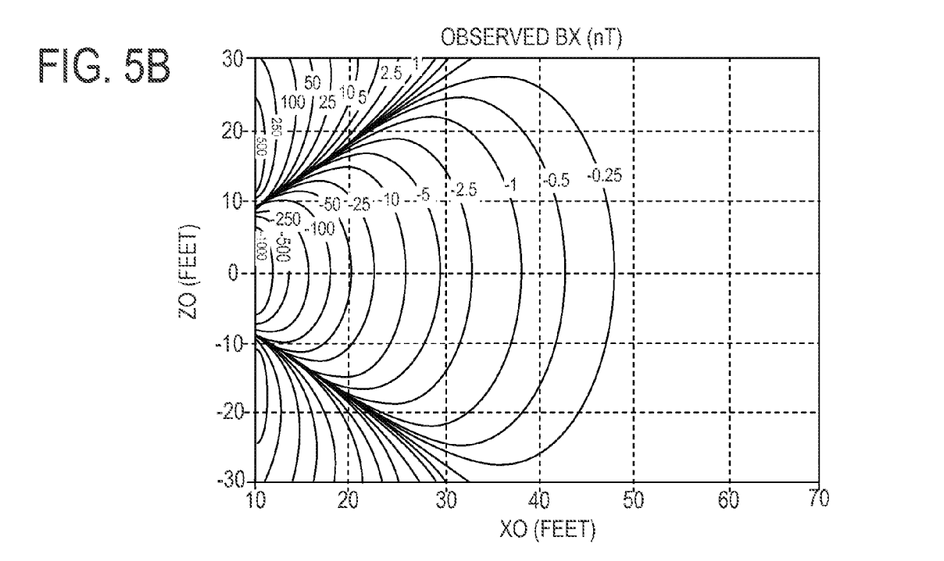
Figure 6A:
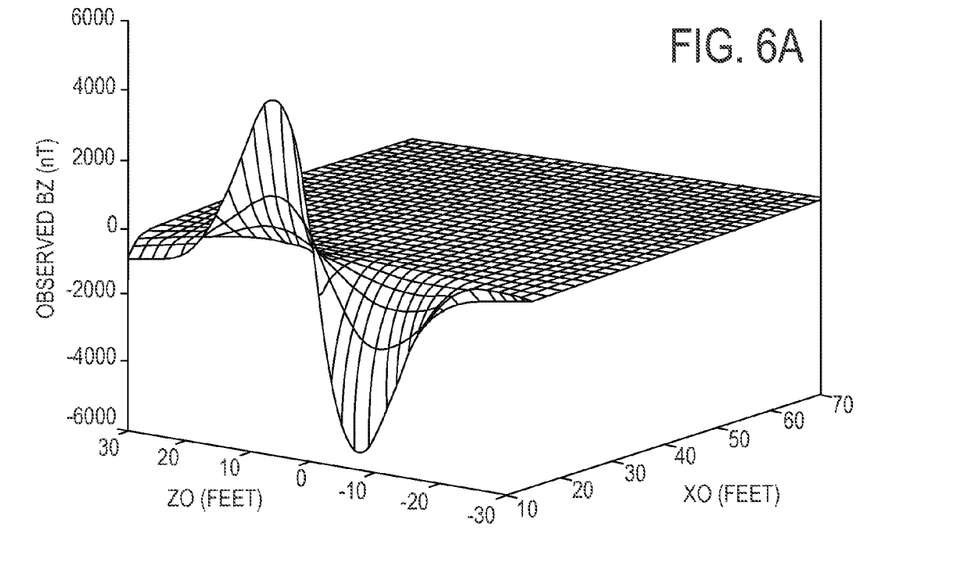
FIGS. 6A-6B show a predicted axial field strength as a function of distance.
Figure 6B:
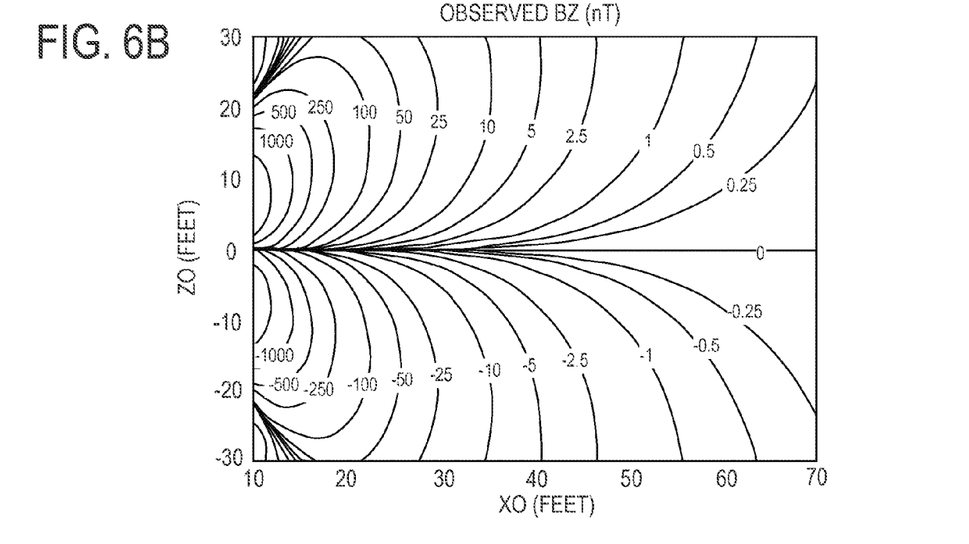

FIGS. 5A and 5B show the expected cross-axial field in nT as a function of distance of the observation point from the source in feet (Zo) and as a function of distance between the casing and the well being drilled (Xo). FIG. 5A shows a 3D plot, whereas FIG. 5B shows a contour plot. FIGS. 6A and 6B similarly show the expected axial magnetic field component in nT as a function of distance of the observation point from the source in feet (Zo) and as a function of distance between the casing and the borehole being drilled (Xo).

As expected, the field falls off very rapidly with distance from the source. A typical magnetometer used in borehole surveying can measure magnetic fields with a calibrated accuracy of 70 nT (see, e.g., Williamson, SPE 56702) and a resolution of about 2 nT. If the signal is detected with a lock-in amplifier, signals 60 dB or more beneath the noise can be recovered. (A lock-in amplifier is also known as a phase-sensitive detector. For the purposes of this disclosure, it will serve as an example of a phase-locked loop. A lock-in amplifier can be implemented either as an analog or a digital device.) With the observation point 30 feet from the source, and using a lock-in amplifier with a 60 dB gain, the observed signal of 0.7 nT will appear as a 700 nT signal. Even if the lock-in only achieves 20 dB of noise rejection, the observed signal will be 7 nT, which is a strong enough signal for further processing.

Note that in this example, the peak response occurs when the observation point (which is situated along the drillstring axis) is at about half the distance between the well being drilled and the casing being monitored. This appears to be a good rule of thumb. The design can be optimized by selecting the strongest practically achievable source and source configuration, determining the maximum signal to noise ratio within the specified acquisition time, and setting the observation point at a location for maximum sensitivity at the maximum desired (and practically achievable) range to the casing to be monitored. However, a better practice may be to operate with an array of sensors at selected observation points along the drillstring.

Earlier in this discussion, it was noted that absolute sensor accuracy is not required in this application, i.e. it is not necessary to precisely calibrate the magnetometers to a precise reading of the magnetic field. However, the sensitivities of the magnetometers should be matched as closely as is possible so as to achieve the maximum cancellation of the earth's field component of the observed signals. Typically, the gain of such sensors is a function of the ambient temperature and can be calibrated using well known procedures, but the extreme rigor required of survey tools in determining biases and misalignments need not be taken. The gains can be calibrated with all of the magnetometers assembled on the casing ranging tool in a uniform and known magnetic field and over a range of ambient temperatures.

Figure 7:
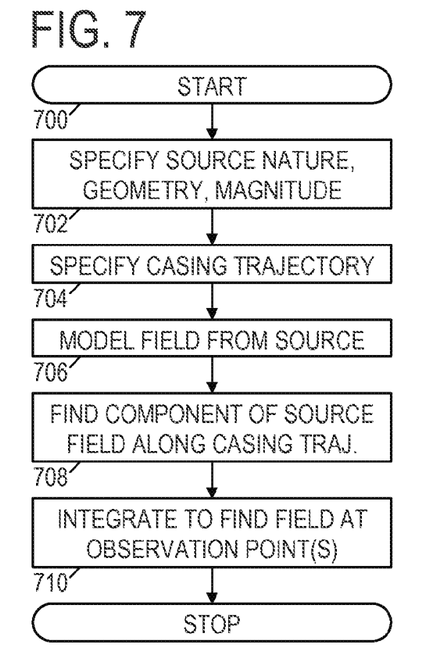
FIG. 7 is a flow diagram of an illustrative forward model.

Once the signals are acquired, they should be interpreted so as to determine the range to the casing and the approach angle relative to the casing. To make this interpretation, we first create a general response model using the technique illustrated in the appendix. As represented in FIG. 7, the general steps of this technique 700 begin in block 702 with a specification of the nature of the source (i.e., whether the source is a dipole, a crossed dipole or some other specific multipole configuration), the geometry of the source (i.e., the orientation of the poles relative to the drillstring axis and how they rotate), the magnitude of the source, and the position of the source relative to the observation points. In block 704, the technique also provides a (possibly tentative) casing trajectory. In at least some embodiments the casing trajectory is specified as a one parameter curve in three-dimensional space, the parameter being distance along the casing from a given point, e.g., the well head or a point of intersection between the borehole trajectory and the casing trajectory. The curve can be specified in an arbitrary fashion, including other parameters, but the single-parameter formulation is used to simplify the integral.

In block 706 the system models the magnetic field emanating from the source. This can certainly be done numerically, but in many instances this can be done with a closed form analytical expression. In block 708, the system determines for each position along the length of the casing trajectory the component of the source's magnetic field that lies parallel to the casing axis. That component induces a magnetic moment that produces a field at the observation point(s). In block 710, the system integrates the fields from the magnetic moments distributed along the length of the casing to obtain the total induced field at the observation point(s).

Figure 8:
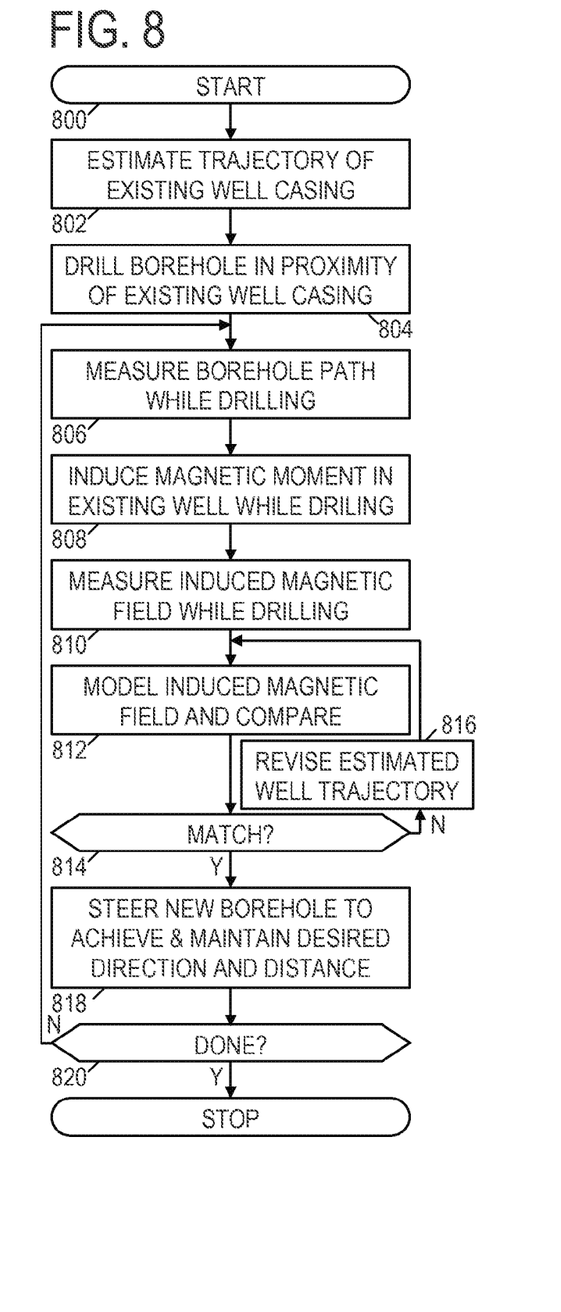
FIG. 8 is a flow diagram of an illustrative ranging method.

After the general response model has been worked out, the procedure illustrated in FIG. 8 is carried out. Procedure 800 begins in block 802 with an estimation of the well casing trajectory. As this estimate will be adapted, it can be based on logging measurements from the well, or it can be an arbitrary starting point (e.g., a vertical well at some distance from the borehole). Drilling commences in block 804, creating a borehole that enters into the proximity of the existing well casing. What constitutes "proximity" may vary based on the capabilities of the system, but it is expected to include a range of at least 10 meters.

During the drilling process, procedure 800 tracks the path of the drillstring (and hence the borehole) in block 806. As the drillstring rotates and progresses, the magnetic source induces a magnetic moment in the casing of the existing well in block 808. In block 810, the magnetometers at the observation point(s) measure the field from the induced magnetic moment. In block 812, the procedure employs the technique 700 (FIG. 7) to determine the expected measurements of the magnetic moment field. The expected measurements may include not only the measurements made by the magnetometers in their current positions and orientations, but also the expected measurements at previous positions and orientations of the magnetometers.

In block 814, the procedure 800 compares the actual measurements to the expected measurements. If a mismatch is detected, the estimated well trajectory is adjusted in block 816 and blocks 812-814 are repeated until a satisfactory match is obtained. Many suitable optimization techniques exist and can be used to determine a relative well casing distance and direction that best fits the field measurements. One illustrative technique is a binary search that, starting with modeled measurements for at least three different distances at four different directions (e.g., 0, 90°, 180°, and 270° from the currently estimated casing direction), systematically searches for an optimum distance and direction. In at least some embodiments, the binary search will be used to optimize the mean square error between the observed signals and the modeled signals. The search is continued until a specified accuracy is attained, or a fixed number of iterations have been carried out. In the former case, the routine then reports the distance from the drill bit to the casing and the relative orientation between the drillstring trajectory and the casing trajectory. In the latter case, this same information is provided along with an error statement.

In block 818, the relative distance and direction may optionally be employed as the drilling progresses to achieve and maintain a desired direction and distance between the borehole and the existing casing. In some cases, the borehole may be drilled to intersect the casing or directed to avoid the casing. In block 820, the procedure determines whether drilling is complete and if not, procedure repeats blocks 806-820 until drilling ceases.

Procedure 800 can be implemented in an application specific integrated circuit or in software on a programmable processor. Although the specific implementation of this procedure may be tedious, such procedures are well known in the art and can be readily derived from the equations in the appendix. Since the response model has been reduced to a one-dimensional integral, and since the form of that integral (due to the nature of the fields) is rapidly converging, the procedure can be carried out quickly in a downhole processor or, if the signals are telemetered to the earth's surface, analysis can be carried out using a computer at the earth's surface. Using uncompiled code and a 2.17 GHz Intel® Core™2 Duo CPI T7500, it took about 0.5 ms to calculate a single point in the model described in the appendix.

Depending on the types of magnets used in the source, it may be necessary to compensate for the drift with time and/or temperature of these magnets. This can be handled in part by periodic calibration of the magnet, but also by introducing the field properties (e.g. dipole moment and orientation) as additional variables in the iterative solution.

Various alternative embodiments exist for exploiting the disclosed techniques. To lock in on the magnetic signal induced in the remote well casing, a reference signal is desirable to indicate the rotation of the magnet mounted on the drillstring. This reference signal can be derived using a distant magnetometer, or other rotation tracking methods can be employed (e.g., gyroscopes, accelerometers to track the gravity vector, optical or acoustic sensors tracking borehole wall variation, etc.). The permanent magnet can be replaced with an electromagnet, enabling optional modulation of the magnetic field. Such modulation could alternatively be provided with a mechanical shield of magnetically permeable material that moves to alternately shunt and release magnetic field lines from the ranging tool. (One suitable example of such a shield mechanism is disclosed in U.S. Pat. No. 7,219,748, "Downhole Signal Source" by Li Gao and Paul Rodney.) With modulation of this form, multiple magnetic sources can be mounted to the drillstring and modulated at different frequencies, thereby providing multiple induced magnetic moments. The magnetic field sensors detect the combined signal, which is then electronically processed to separate out multiple ranging measurements based on the modulating frequencies. Of course, such frequency variation can also be provided by giving each of the magnetic sources a different number of poles (bipole, quadrupole, hexapole, etc), or by spinning the different magnetic sources at different rates. In one example, one magnetic source can be mounted at the bit, while another magnetic source is mounted above the mud motor, and hence rotated at a slower speed. Alternatively, each magnet can be mounted on a dedicated motor that spins the magnet at a unique or variable speed.

Electromagnets or magnetic shields can alternatively be employed to implement time division multiplexing, where only one of multiple magnetic field sources is active (uncovered) at a time.

It is expected that the system range and performance can be extended with the use of multiple receiver stations and/or multiple transmit stations. In many situations, it may not be necessary to perform explicit distance and direction calculations. For example, the measure magnetic field values may be converted to pixel colors or intensities and displayed as a function of borehole azimuth and distance along the borehole axis. Assuming the reference borehole is within detection range, the reference borehole will appear as a bright (or, if preferred, a dark) band in the image. The color or brightness of the band indicates the distance to the reference borehole, and the position of the band indicates the direction to the reference borehole. Thus, by viewing such an image, a driller can determine in a very intuitive manner whether the new borehole is drifting from the desired course and he or she can quickly initiate corrective action. For example, if the band becomes dimmer, the driller can steer towards the reference borehole. Conversely, if the band increases in brightness, the driller can steer away from the reference borehole. If the band deviates from its desired position directly above or below the existing borehole, the driller can steer laterally to re-establish the desired directional relationship between the boreholes.

Our disclosed approach is expected to provide a commercial and competitive advantage in that it provides a means of ranging with confidence near casings that have not been pre-polarized.

Numerous variations and modifications will become apparent to those skilled in the art once the above disclosure is fully appreciated. It is intended that the following claims be interpreted to embrace all such variations and modifications.

APPENDIX

Derivation of the magnetic field at an observation point on a drillstring from the scattering off of casing of the magnetic field of a dipole source rotating on the drillstring. In a set of cyllindrical coordinates with polar angle θ referenced to the direction of the dipole moment, the magnetic field a point dipole is given by:

$$Br = \frac{\mu_0 |\vec{m}| \cos[\theta]}{2\pi * r^3}$$

-continued $$B\theta = \frac{\mu_0 |\vec{m}| \sin[\theta]}{4\pi * r^3}$$

$$B\phi = 0$$

where
r is the distance from the center of the dipole to the observation point
θ is the angle between a vector from the center of the dipole to the observation point and the magnetic moment $\vec{m}$
φ is the azimuthal angle. By symmetry, Bφ vanishes and hence, Bφ will not be considered further in this analysis.
μ is the magnetic permeability of the medium (assumed infinite and homogeneous) in which the dipole is observed. This latter assumption will be violated by the very nature of the problem we are trying to solve, but I will work in the approximation that it is valid.

Now suppose that the magnet is in a vertical well with the axis of the moment orthogonal to the well axis, i.e. with the magnetic moment in the horizontal plane. Suppose further that a string of casing is located in space along a straight line.

The center dipole source will be defined as the origin of the coordinate system. The point defining the center of the dipole and the path of the center line of the casing define a unique plane.

Let the line defining the center of the casing be given by $$x=\xi*t+\rho;\ y=\nu*t+\sigma;\ z=\zeta*t+\tau;$$

The equation defining a plane is $$\alpha*x+\beta*y+\gamma*z+\delta=0$$

$$\alpha*(\xi*t+\rho)+\beta*(\nu*t+\sigma)+\gamma*(\zeta*t+\tau)+\delta=0 \forall t$$

Pick two points on the line and the location of the magnet (0, 0, 0)

$$\beta\left(\sigma - \frac{\nu\rho}{\xi}\right) + \gamma\left(\tau - \frac{\zeta\rho}{\xi}\right) + \delta = 0$$

$$\alpha\left(\rho - \frac{\xi\sigma}{\nu}\right) + \gamma\left(\tau - \frac{\zeta\sigma}{\nu}\right) + \delta = 0$$

$$\delta = 0$$

This implies that the equation can be multiplied through by an overall scaling factor, so we can arbitrarily set one coefficient to 1 (a possible exception is a case where it might be required to vanish). The other two are then uniquely defined. ∴, unless $$\tau - \frac{\zeta\rho}{\xi} = 0 \text{ or } \tau - \frac{\zeta\sigma}{\nu} = 0$$

set $$\alpha = 1$$

$$\gamma = -\frac{\left(\rho - \frac{\xi\sigma}{\nu}\right)}{\left(\tau - \frac{\zeta\sigma}{\nu}\right)}$$

$$\beta = \frac{\left(\rho - \frac{\xi\sigma}{\mu}\right) * \left(\tau - \frac{\zeta\rho}{\xi}\right)}{\left(\tau - \frac{\zeta\sigma}{\mu}\right) * \left(\sigma - \frac{\mu\rho}{\xi}\right)}$$

Now calculate the magnetic field along the centerline of the casing. First, the magnetic field of the source must be expressed in the x, y, z coordinate system defined by these equations.

It is assumed that the dipole moment is orthogonal to the drill pipe (assumed vertical for simplicity—for a commercial algorithm, this will need to be modified, but for a scoping analysis, no generality is lost with this assumption). It is further assumed that the moment of the dipole makes an angle Ψ with respect to the x-axis.

The polar angle θ must be calculated in terms of Ψ and the point at which the field interacts with the casing. Taking a unit vector along the dipole moment and resolving it along the x- and y-axes, and then taking the inner product between the interaction vector (x, y, z) and the unit vector, $$\theta = \text{ArcCos}\left[\frac{x * \text{Cos}[\Psi] + y * \text{Sin}[\Psi]}{\sqrt{x^2 + y^2 + z^2}}\right]$$

From this, it is possible to calculate Br and Bθ, but these must be resolved along the x-, y- and z-axes, and in particular, the projection of B must be taken on the casing.

$$Br = \frac{\mu|\overline{m}|\text{Cos}[\theta]}{2\pi * ((x'')^2 + (y'')^2 + z^2)^{\frac{3}{2}}}$$

$$B\theta = \frac{\mu|\overline{m}|\text{Sin}[\theta]}{4\pi * ((x'')^2 + (y'')^2 + z^2)^{\frac{3}{2}}}$$

$$Br = \frac{\mu|\overline{m}|\text{Cos}[\theta]}{2\pi * (x^2 + y^2 + z^2)^{\frac{3}{2}}}$$

$$B\theta = \frac{\mu|\overline{m}|\text{Sin}[\theta]}{4\pi * (x^2 + y^2 + z^2)^{\frac{3}{2}}}$$

First, define a set of coordinates (x'', y'', z) in which the x'' axis is along the dipole axis (positive direction in the positive direction of the moment). Then resolve the vector components onto the (x, y, z) coordinate system.

$$Bz = \hat{k} \cdot \vec{B}$$

$$Bz = \hat{k} \cdot (Br * \hat{e}r + B\theta * \hat{e}\theta)$$

$$Bz = \frac{z}{\sqrt{x^2 + y^2 + z^2}} * Br + B\theta * \hat{k} \cdot \hat{e}\theta$$

$$\hat{e}\theta = \hat{r} \times \left(\hat{r} \times \frac{\overline{m}}{m}\right) = \hat{r}\left(\hat{r} \cdot \frac{\overline{m}}{m}\right) - \frac{\overline{m}}{m}$$

$$\hat{k} \cdot \hat{e}\theta = \frac{z}{\sqrt{x^2 + y^2 + z^2}}\hat{r} \cdot \frac{\overline{m}}{m}$$

$$\hat{k} \cdot \hat{e}\theta = \frac{z}{x^2 + y^2 + z^2}(x * \text{Cos}[\Psi] + y * \text{Sin}[\Psi])$$

$$Bz = \frac{z}{\sqrt{x^2 + y^2 + z^2}} * Br + B\theta * \frac{z}{x^2 + y^2 + z^2}(x * \text{Cos}[\Psi] + y * \text{Sin}[\Psi])$$

$$Bx = \hat{i} \cdot \vec{B}$$

$$Bx = \hat{i} \cdot (Br * \hat{r} + B\theta * \hat{\theta})$$

$$Bx = Br * \frac{x}{\sqrt{x^2 + y^2 + z^2}} + B\theta * \left(\frac{x}{\sqrt{x^2 + y^2 + z^2}}\text{Cos}[\theta] - \text{Cos}[\Psi]\right)$$

$$By = \hat{j} \cdot \vec{B}$$

$$By = Br * \frac{y}{\sqrt{x^2 + y^2 + z^2}} + B\theta * \left(\frac{y}{\sqrt{x^2 + y^2 + z^2}}\text{Cos}[\theta] - \text{Sin}[\Psi]\right)$$

Substituting $$\text{Cos}[\theta] = \frac{x''}{\sqrt{(x'')^2 + (y'')^2 + z^2}}$$

$$\text{Sin}[\theta] = \pm\sqrt{\frac{(y'')^2 + z^2}{(x'')^2 + (y'')^2 + z^2}}$$

$$\text{Cos}[\theta] = \frac{x * \text{Cos}[\Psi] + y * \text{Sin}[\Psi]}{\sqrt{x^2 + y^2 + z^2}} \quad (* \text{ As before } *)$$

$$\text{Sin}[\theta] = \sqrt{\frac{(x * \text{Sin}[\Psi] - y * \text{Cos}[\Psi])^2 + z^2}{x^2 + y^2 + z^2}}$$

$$Bx = Br * \frac{x}{\sqrt{x^2 + y^2 + z^2}} +$$

$$B\theta * \left(\frac{x}{x^2 + y^2 + z^2}(x * \text{Cos}[\Psi] + y * \text{Sin}[\Psi]) - \text{Cos}[\Psi]\right)$$

$$By = Br * \frac{y}{\sqrt{x^2 + y^2 + z^2}} +$$

$$B\theta * \left(\frac{y}{x^2 + y^2 + z^2}(x * \text{Cos}[\Psi] + y * \text{Sin}[\Psi]) - \text{Sin}[\Psi]\right)$$

$$Bz = \frac{z}{\sqrt{x^2 + y^2 + z^2}} * Br + B\theta * \frac{z}{x^2 + y^2 + z^2}(x * \text{Cos}[\Psi] + y * \text{Sin}[\Psi])$$

Substituting from the relations for Br and Bθ (restated here for convenience)

$$B\theta = \frac{\mu_0|\overline{m}|\sqrt{(x * \text{Sin}[\Psi] - y * \text{Cos}[\Psi])^2 + z^2}}{4\pi * (x^2 + y^2 + z^2)^2}$$

$$Br = \frac{\mu_0|\overline{m}|(x * \text{Cos}[\Psi] + y * \text{Sin}[\Psi])}{2\pi * (x^2 + y^2 + z^2)^2}$$

$$Bx = \left(\frac{\mu_0|\overline{m}|(x * \text{Cos}[\Psi] + y * \text{Sin}[\Psi])}{2\pi * (x^2 + y^2 + z^2)^2}\right) * \frac{x}{\sqrt{x^2 + y^2 + z^2}} +$$

$$\left(\frac{\mu_0|\overline{m}|\sqrt{(x * \text{Sin}[\Psi] - y * \text{Cos}[\Psi])^2 + z^2}}{4\pi * (x^2 + y^2 + z^2)^2}\right) *$$

$$\left(\frac{x}{x^2 + y^2 + z^2}(x * \text{Cos}[\Psi] + y * \text{Sin}[\Psi]) - \text{Cos}[\Psi]\right)$$

$$Bx = \frac{\mu_0|\overline{m}|}{2\pi * (x^2 + y^2 + z^2)^2} * \left((x * \text{Cos}[\Psi] + y * \text{Sin}[\Psi]) * \frac{x}{\sqrt{x^2 + y^2 + z^2}} + \right.$$

$$\left(\frac{\sqrt{(x * \text{Sin}[\Psi] - y * \text{Cos}[\Psi])^2 + z^2}}{2}\right) *$$

$$\left.\left(\frac{x}{x^2 + y^2 + z^2}(x * \text{Cos}[\Psi] + y * \text{Sin}[\Psi]) - \text{Cos}[\Psi]\right)\right)$$

-continued $$By = \frac{\mu_0 |\vec{m}|}{2\pi * (x^2 + y^2 + z^2)^2} * \left( (x * \text{Cos}[\Psi] + y * \text{Sin}[\Psi]) * \frac{y}{\sqrt{x^2 + y^2 + z^2}} + \right.$$

$$\left( \frac{\sqrt{(x * \text{Sin}[\Psi] - y * \text{Cos}[\Psi])^2 + z^2}}{2} \right) *$$

$$\left. \left( \frac{y}{x^2 + y^2 + z^2} (x * \text{Cos}[\Psi] + y * \text{Sin}[\Psi]) - \text{Cos}[\Psi] \right) \right)$$

$$Bz = z * \frac{\mu_0 |\vec{m}| (x * \text{Cos}[\Psi] + y * \text{Sin}[\Psi])}{2\pi * (x^2 + y^2 + z^2)^{\frac{5}{2}}} *$$

$$\left( 1 + \frac{\sqrt{(x * \text{Sin}[\Psi] - y * \text{Cos}[\Psi])^2 + z^2}}{2 * \sqrt{x^2 + y^2 + z^2}} \right)$$

This is remarkably simple.

The next step is to project the B-field along the casing and calculate the moment induced along the z-axis of the casing. In a more sophisticated analysis, the moment induced orthogonal to the casing should also be taken into account, but this is expected to have only a minor effect on the analysis, which could/should be taken into account when the source is very close to the casing. I will need to work out the criteria for this.

The component of the field along the casing is calculated by expressing x, y and z in terms of the parameter t, the distance along the casing and projecting the field along the casing. The unit vector along the casing is given by $$\hat{c} = \frac{\xi}{\sqrt{\xi^2 + \upsilon^2 + \zeta^2}} \hat{i} + \frac{\upsilon}{\sqrt{\xi^2 + \upsilon^2 + \zeta^2}} \hat{j} + \frac{\zeta}{\sqrt{\xi^2 + \upsilon^2 + \zeta^2}} \hat{k}$$

Normally, one works in units $\ni \sqrt{\xi^2 + \upsilon^2 \alpha \zeta^2} = 1$, so that $\xi$, $\upsilon$ and $\zeta$ are direction cosines.

Then the field induced along the casing is given by $$Bc = (\xi * Bx + \upsilon * By + \zeta * Bz) * \mu_r$$

That is, I have taken the ambient field tangential to the casing axis and multiplied it by the relative permeability of the casing.

The magnetic moment induced along the casing will act as a source. It is calculated as follows: (starting with a general relation and then particularizing it)

$$B = \mu_0 * (M + H)$$

$$M = \frac{B}{\mu_0} - H$$

$$B = \mu_r * \mu_0 * H$$

$$M = \frac{B}{\mu_0} - \frac{B}{\mu_r * \mu_0}$$

$$M = \frac{B}{\mu_0} \left( 1 - \frac{1}{\mu_r} \right)$$

$$M = \frac{B}{\mu_0 * \mu_r} (\mu_r - 1)$$

$$\vec{Mc} = \frac{\mu_r - 1}{\mu_0 * \mu_r} Bc * \hat{c}$$

Where $\mu_r$ is the relative permeability of the casing.

From this, it is possible to calculate the magnetic field at the observation point. In this problem, it is possible to define a vector potential $$\phi[x', y', z'] = \frac{1}{4\pi} \int \vec{Mc} \cdot \nabla \left( \frac{1}{r} \right) dv$$

where the integral is carried out over the volume of the casing. The field from this potential, which is the field we want to observe is given by $$\vec{BO} = -\mu_0 * \nabla' \phi$$

Where the gradient is on the observation coordinates (as defined in this problem, (x', y', z')) and a is the effective radius of the casing. (a=$\sqrt{ro^2 - ri^2}$) where ro is the outer radius of the casing and ri is the inner radius of the casing.

$$\vec{BO} = -\frac{\mu_0}{4\pi} \frac{(\mu_r - 1)}{\mu_0 * \mu_r} *$$

$$\nabla' \int_{t1}^{t2} Bc * \hat{c} \cdot \nabla \left( \frac{1}{\sqrt{(x' - x(t))^2 + (y' - y(t))^2 + (z' - z(t))^2}} \right) \pi * a^2 dt$$

Consider $$\hat{c} \cdot \nabla \left( \frac{1}{\sqrt{(x' - x(t))^2 + (y' - y(t))^2 + (z' - z(t))^2}} \right) =$$

$$-\frac{((x' - x(t)) * \xi + (y' - y(t)) * \upsilon + (z' - z(t)) * \zeta)}{((x' - x(t))^2 + (y' - y(t))^2 + (z' - z(t))^2)^{3/2}}$$

The primed gradient can be commuted through the integral and does not operate on Bc.

$$\nabla' \left( \hat{c} \cdot \nabla \left( \frac{1}{\sqrt{(x' - x(t))^2 + (y' - y(t))^2 + (z' - z(t))^2}} \right) \right) =$$

$$-\frac{\hat{c}}{((x' - x(t))^2 + (y' - y(t))^2 + (z' - z(t))^2)^{3/2}} +$$

$$3 * \frac{((x' - x(t)) * \xi + (y' - y(t)) * \upsilon + (z' - z(t)) * \zeta)}{((x' - x(t))^2 + (y' - y(t))^2 + (z' - z(t))^2)^{5/2}}$$

$$((x' - x(t)) * \hat{i} + (y' - y(t)) * \hat{j} + (z' - z(t)) * \hat{k})$$

Since the integration is not over x', y' or z', these can be factored out of the integral. Furthermore, from the way the problem has been formulated, x'=y'=0, so we get a very slight simplification:

$$\nabla' \left( \hat{c} \cdot \nabla \left( \frac{1}{\sqrt{(x' - x(t))^2 + (y' - y(t))^2 + (z' - z(t))^2}} \right) \right) =$$

$$-\frac{\hat{c}}{(x(t)^2 + y(t)^2 + (z' - z(t))^2)^{3/2}} +$$

$$3 * \frac{(x(t) * \xi + y(t) * \upsilon - (z' - z(t)) * \zeta)}{(x(t)^2 + y(t)^2 + (z' - z(t))^2)^{5/2}} (x(t) * \hat{i} + y(t) * \hat{j} - (z' - z(t)) * \hat{k})$$

$$\vec{BO} = \frac{a^2}{4} \frac{(\mu_r - 1)}{\mu_r} \int_{t1}^{t2} Bc * \left( \frac{\hat{c}}{(x(t)^2 + y(t)^2 + (z' - z(t))^2)^{3/2}} - \right.$$

-continued $$3 * \frac{(x(t) * \xi + y(t) * \upsilon - (z' - z(t)) * \zeta)}{(x(t)^2 + y(t)^2 + (z' - z(t))^2)^{5/2}}$$

$$(x(t) * \hat{i} + y(t) * \hat{j} - (z' - z(t)) * \hat{k})\bigg) * dt$$

$$BOx = \frac{a^2}{4} \frac{(\mu_r - 1)}{\mu_r} \int_{t1}^{t2} Bc * \left( \frac{\xi}{(x(t)^2 + y(t)^2 + (z' - z(t))^2)^{3/2}} - \right.$$

$$\left. 3 * \frac{(x(t) * \xi + y(t) * \upsilon - (z' - z(t)) * \zeta)}{(x(t)^2 + y(t)^2 + (z' - z(t))^2)^{5/2}} x(t) \right) * dt$$

$$BOy = \frac{a^2}{4} \frac{(\mu_r - 1)}{\mu_r} \int_{t1}^{t2} Bc * \left( \frac{\upsilon}{(x(t)^2 + y(t)^2 + (z' - z(t))^2)^{3/2}} - \right.$$

$$\left. 3 * \frac{(x(t) * \xi + y(t) * \upsilon - (z' - z(t)) * \zeta)}{(x(t)^2 + y(t)^2 + (z' - z(t))^2)^{5/2}} y(t) \right) * dt$$

$$BOz = \frac{a^2}{4} \frac{(\mu_r - 1)}{\mu_r} \int_{t1}^{t2} Bc * \left( \frac{\zeta}{(x(t)^2 + y(t)^2 + (z' - z(t))^2)^{3/2}} + \right.$$

$$\left. 3 * \frac{(x(t) * \xi + y(t) * \upsilon - (z' - z(t)) * \zeta)}{(x(t)^2 + y(t)^2 + (z' - z(t))^2)^{5/2}} (z' - z(t)) \right) * dt$$

Suppose the casing is vertical such that $x(t) = x0; (* \text{ a fixed value } *)$
$\xi = 0;$
$\rho = x0;$
$y(t) = 0;$
$\upsilon = 0;$
$\sigma = 0;$
$z(t) = z; (* \text{ a variable } *)$
$\zeta = 1;$
$\tau = 0;$
$Bc = \mu_r * Bz \ (* \text{ for this problem only} *)$ $$Bc = z * \frac{\mu_0 * \mu_r |\overline{m}|(x * \text{Cos}[\Psi] + y * \text{Sin}[\Psi])}{2\pi * (x^2 + y^2 + z^2)^{\frac{5}{2}}} *$$

$$\left(1 + \frac{\sqrt{(x * \text{Sin}[\Psi] - y * \text{Cos}[\Psi])^2 + z^2}}{2 * \sqrt{x^2 + y^2 + z^2}}\right)$$

$$BOx = 3 \frac{a^2}{8\pi} (\mu_r - 1) x0 * \text{Cos}[\Psi] * \mu_0 |\overline{m}|$$

$$\int_{t1}^{t2} \left( \frac{z}{(x0^2 + z^2)^{\frac{5}{2}}} * \left(1 + \frac{\sqrt{(x0 * \text{Sin}[\Psi])^2 + z^2}}{2 * \sqrt{x0^2 + z^2}}\right)\right) *$$

$$\left( \frac{(z' - z)}{(x0^2 + (z' - z)^2)^{5/2}} \right) * dz$$

$BOy = 0$ $BOz =$ $$\frac{a^2}{8\pi} (\mu_r - 1) \mu_0 |\overline{m}| \int_{t1}^{t2} \left( z * \frac{x0 * \text{Cos}[\Psi]}{(x0^2 + z^2)^{\frac{5}{2}}} * \left(1 + \frac{\sqrt{(x0 * \text{Sin}[\Psi])^2 + z^2}}{2 * \sqrt{x0^2 + z^2}}\right)\right) *$$

$$\left( \frac{1}{(x0^2 + (z' - z)^2)^{3/2}} - 3 * \frac{(z' - z)^2}{(x0^2 + (z' - z)^2)^{5/2}} \right) * dz$$

Examining the behavior of these
BOy should vanish given the geometry of the problem.
BOx
The dependence of the integrand for large magnitude of z is approximately $1/z^8$
It seemed surprising at first that when $z'=0$, $BOx \neq 0$. However, in this case, the z-projection of the field on the casing
looks a bit like a 1-dimensional magnetic monopole.
Hence, this is to be expected.
BOz
The z-dependence of the integrand for large magnitude of z is approximately $1/z^7$
How this will play out when the integrals are actually evaluated remains to be seen. The induced moment should go as the cube of the distance from the source. When this is induced as a net dipole moment, it will set up another dipole field that should fall off as an inverse cube. However, there are orientations when the dipole source magnet is directly facing the casing, at the same depth as the source magnet, the induced field looks more like a monopole field.

Calculations
Setting $$\frac{\mu_0 |\overline{m}|}{2\pi} \equiv S$$

The previous special case is reformulated as $$BOx = 3 \frac{a^2}{4} (\mu_r - 1) x0 * \text{Cos}[\Psi] * S \int_{t1}^{t2} \frac{z}{(x0^2 + z^2)^{\frac{5}{2}}} *$$

$$\left(1 + \frac{\sqrt{(x0 * \text{Sin}[\Psi])^2 + z^2}}{2 * \sqrt{x0^2 + z^2}}\right) * \left( \frac{(z' - z)}{(x0^2 + (z' - z)^2)^{5/2}} \right) * dz$$

$$BOz = \frac{a^2}{4} (\mu_r - 1) S \int_{t1}^{t2} z * \frac{x0 * \text{Cos}[\Psi]}{(x0^2 + z^2)^{\frac{5}{2}}} * \left(1 + \frac{\sqrt{(x0 * \text{Sin}[\Psi])^2 + z^2}}{2 * \sqrt{x0^2 + z^2}}\right) *$$

$$\left( \frac{1}{(x0^2 + (z' - z)^2)^{3/2}} - 3 * \frac{(z' - z)^2}{(x0^2 + (z' - z)^2)^{5/2}} \right) * dz$$

What is claimed is:

1. A ranging while drilling system that comprises:
a drillstring having:
a magnetic source that induces a magnetic moment in a casing string, wherein the magnetic source includes at least one dipole with a non-orthogonal tilt relative to a longitudinal axis of the drillstring;
at least one three-axis magnetometer that detects a field from the induced magnetic moment; and
a sensor that provides a signal indicative of a rotational orientation of the magnetic source; and
a processor that determines a relative distance and direction of the casing string from measurements by the sensor and the at least one three-axis magnetometer.

2. The system of claim 1, wherein the sensor comprises a second three-axis magnetometer.

3. The system of claim 1, wherein the sensor is in a set consisting of gyroscopes, accelerometers, and optical and acoustic borehole wall variation sensors.

4. The system of claim 1, wherein the at least one three-axis magnetometer is one of an array of axially-spaced magnetometers.

5. The system of claim 4, further comprising a digital phase-locked loop that filters and demodulates measurements from the array of axially-spaced magnetometers.

6. The system of claim 1, further comprising a steering mechanism that is guided at least in part based on said distance and direction.

7. The system of claim 1, wherein the magnetic source comprises a permanent magnet.

8. The system of claim 7, wherein the magnetic source has shielding that modulates an emanated field.

9. The system of claim 1, wherein the magnetic source is an electromagnet.

10. The system of claim 1, wherein the magnetic source include multiple dipoles.

11. The system of claim 1, wherein the magnetic source includes at least one dipole orthogonal to the longitudinal axis of the drillstring.

12. The system of claim 1, wherein the magnetic source rotates with the drillstring.

13. The system of claim 1, wherein the magnetic source rotates relative to the drillstring.

14. The system of claim 1, wherein the measurements by the sensor correspond to signals indicative of rotational orientation of the magnetic source as a function of time and wherein the measurements by the at least one three-axis magnetometer correspond to detected fields resulting from variance of the induced magnetic moment as a function of the at least one dipole's tilt and drillstring rotation.

15. A ranging while drilling method that comprises:
employing a rotating magnet in a drill string to induce a changing magnetic moment in an existing casing string, wherein the rotating magnet comprises at least one dipole with a non-orthogonal tilt relative to a longitudinal drillstring axis;
measuring, by a sensor in the drillstring a field from the changing magnetic moment in the casing string as a function of time along a path of a drillstring to a current position of the drill string; and
based at least in part upon said field measurements, estimating a distance and direction to the casing string from the current position.

16. The method of claim 15, further comprising sensing a rotational orientation of the rotating magnet.

17. The method of claim 16, wherein said estimating includes filtering the field measurements based on said rotational orientation to isolate field contributions from the changing magnetic moment.

18. The method of claim 15, further comprising steering a drillstring based at least in part on said distance and direction.

19. The method of claim 15, wherein the rotating magnet comprising at least one dipole orthogonal to the longitudinal drillstring axis.

20. The method of claim 15, wherein the rotating magnet comprises multiple dipoles.

21. The method of claim 15, further comprising:
measuring the field using a plurality of axially-spaced magnetometers; and
filtering and demodulating measurements from the plurality of axially-spaced magnetometers using a digital phase-locked loop.

22. The method of claim 15, wherein the field measurements vary as a function of the at least one dipole's tilt and drillstring rotation.

* * * * *